US007694011B2

(12) United States Patent
O'Rourke et al.

(10) Patent No.: US 7,694,011 B2
(45) Date of Patent: Apr. 6, 2010

(54) TECHNIQUES FOR LOAD BALANCING OVER A CLUSTER OF SUBSCRIBER-AWARE APPLICATION SERVERS

(75) Inventors: Christopher C. O'Rourke, Apex, NC (US); Robert Batz, Raleigh, NC (US); Kevin Shatzkamer, NYC, NY (US)

(73) Assignee: Cisco Technology, Inc., San Jose, CA (US)

( * ) Notice: Subject to any disclaimer, the term of this patent is extended or adjusted under 35 U.S.C. 154(b) by 964 days.

(21) Appl. No.: 11/333,573

(22) Filed: Jan. 17, 2006

(65) Prior Publication Data

US 2007/0165622 A1    Jul. 19, 2007

(51) Int. Cl.
G06F 15/173 (2006.01)
(52) U.S. Cl. .................. 709/238; 709/240; 709/242
(58) Field of Classification Search .......... 709/203, 709/223, 230–232, 238–242
See application file for complete search history.

(56) References Cited

U.S. PATENT DOCUMENTS

| 6,853,642 | B1 | 2/2005 | Sitaraman et al. | |
| 6,856,991 | B1* | 2/2005 | Srivastava | 707/10 |
| 6,859,438 | B2* | 2/2005 | Haddock et al. | 370/235 |
| 7,088,718 | B1* | 8/2006 | Srivastava | 370/392 |
| 7,095,732 | B1 | 8/2006 | Watson, Jr. | |
| 7,277,945 | B1 | 10/2007 | Shah et al. | |
| 7,457,865 | B2* | 11/2008 | Ramakrishnan et al. | 709/224 |
| 7,460,504 | B2* | 12/2008 | Tsirtsis et al. | 370/331 |

FOREIGN PATENT DOCUMENTS

| CN | 101443750 | 5/2009 |
| EP | 1985076 | 10/2008 |
| WO | 2007/106606 A2 | 9/2007 |

OTHER PUBLICATIONS

Radius Load Balancing, Cisco Systems, Inc., San Jose, CA, 18pp, Mar. 2004, http://www.cisco.com/application/pdf/en/us/guest/netsol/ns377/c649/cdccont_0900aecd800eb95f.pdf.
PCT Notification of Transmittal of the International Search Report and the Written Opinion of the International Searching Authority, or the Declaration for PCT/US07/60305 mailed Sep. 29, 2008; 6 pages.
India Patent Application Serial No. 5485/DELNP/2008 filed Jun. 24, 2008, entitled "Techniques for Load Balancing Over a Cluster of Subscriber-Aware Application Servers," Inventor(s): Christopher C. O'Rourke et al.; 43 pages.

* cited by examiner

*Primary Examiner*—Hussein Elchanti
(74) *Attorney, Agent, or Firm*—Patent Capital Group (57) ABSTRACT

Techniques for distributing control plane traffic, from an end node in a packet switched network to a cluster of service gateway nodes that host subscriber-aware application servers, include receiving a control plane message for supporting data plane traffic from a particular subscriber. A particular service gateway node is determined among the cluster of service gateway nodes based on policy-based routing (PBR) for the data plane traffic from the particular subscriber. A message based on the control plane message is sent to a control plane process on the particular service gateway node. Thereby, data plane traffic and control plane traffic from the same subscriber are directed to the same gateway node, or otherwise related gateway nodes, of the cluster of service gateway nodes. This approach allows currently-available, hardware-accelerated PBR to be used with clusters of subscriber-aware service gateways that must also monitor control plane traffic from the same subscriber.

17 Claims, 4 Drawing Sheets

FIG. 1A

TECHNIQUES FOR LOAD BALANCING OVER A CLUSTER OF SUBSCRIBER-AWARE APPLICATION SERVERS

BACKGROUND OF THE INVENTION

1. Field of the Invention

The present invention relates to distributing traffic load in a packet-switched network among application proxies that are subscriber aware, such as service gateways that charge for application activity, with load balancers; and, in particular, to distributing the load consistently for both control plane and data plane packets while leveraging accelerated policy-based routing engines on the load balancer for data plane traffic.

2. Description of the Related Art

Networks of general-purpose computer systems connected by external communication links are well known. The networks often include one or more network devices that facilitate the passage of information between the computer systems. A network node is a network device, computer system or other device connected by the communication links. As used herein, an end node is a network node that is configured to originate or terminate communications over the network. In contrast, an intermediate network node facilitates the passage of data between end nodes.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. In networking parlance, a tunnel for data is simply a protocol that encapsulates that data.

Routers and switches are network devices that determine which communication link or links to employ to support the progress of data packets through the network. A network node that determines which links to employ based on information in the internetwork header (layer 3) is called a router. Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

Subscribers obtain access to a packet-switched network (PSN) of an Internet Service Provider (ISP) through a Network Access Server (NAS). A subscriber often uses a link-layer protocol to form a temporary tunnel between the subscriber's device and the NAS. The contents of the tunneling protocol payload are not involved in determining the path. The NAS determines whether an entity attempting access is in fact a subscriber authorized to access the network by exchanging packets with an Authentication, Authorization, and Accounting (AAA) server. Example well-known AAA servers include the Remote Authentication Dial In User Service (RADIUS) server, Terminal Access Controller Access Control System (TACACS), and the DIAMETER server. Once the entity is authenticated to be an authorized subscriber, then access is granted to the ISP network, the subscriber is assigned a network layer address, such as an Internet Protocol (IP) address, and internetwork-layer payloads are routed based on the internetwork and higher layer header information.

A modem ISP can offer different services to different subscribers. For example, the rate of data delivery of large Web pages to some subscribers can be increased by compressing the Web pages before delivery and un-compressing the Web pages at a process on the subscriber's own equipment. As is well known in the art, Web pages are transmitted over a network using the Hypertext Transfer Protocol (HTTP), an application-layer (layer 7) protocol. Certain Web pages can be blocked using a Web filtering service. A service that provides some combination of compression, filtering and local caching of Web pages is called Web optimization. Some subscribers use mobile devices, such as cell phones, that have smaller memory and display capacities than other network devices. Web pages are communicated to such mobile devices using special protocols, such as the Wireless Application Protocol (WAP), an application-layer protocol. HTTP payloads are translated to WAP payloads before delivery to these subscribers.

To deliver these special services, service gateways are included in the ISP packet switched networks. Service gateways are processes that operate on intermediate network devices between the source and the destination of data packets. The service gateways use a payload in a data packet to provide the networking service. Example services include payload translation, just described, and other payload changes, as well as special billing, rating, filtering services and other services that do not modify the contents of a payload. For example, Web compression gateways compress HTTP payloads of data packets directed to a subscriber's device and un-compress HTTP payloads of data packets originating from a subscriber's device. A WAP 1.x gateway converts HTTP payloads of data packets directed to a subscriber's device to WAP 1.x payloads and converts WAP 1.x payloads of data packets originating from a subscriber's device to HTTP payloads. Some ISPs offer different services to different subscribers. These are subscriber-aware services.

To ensure that a service gateway for a service offered by the ISP is included in packet-switched paths from the subscriber to any destination on the network accessed by the ISP network, the service gateway is included in routes to data plane destinations and a proxy for control plane destinations used to set up a subscriber's session on the network. For example, AAA server traffic for a NAS is directed to a service gateway, which serves as a proxy for the AAA server. A subscriber-aware service gateway monitors the AAA server traffic to determine the remote user's network identifier and whether the remote user has subscribed to the service provided by the gateway. For example, the service gateway monitors RADIUS to determine mapping of subscriber ID to currently assigned network ID; and, in addition, RADIUS is used to relay information on users' subscribed service profile to the network elements from a back-end database, typically behind the RADIUS server.

It is common for an ISP to include a cluster of service gateways so the service can be scaled to the number of subscribers. To distribute traffic among the service gateways in the cluster, a load balancing process (called a load balancer herein) is included in the path between the NAS (or other end node) and the cluster of service gateways. To handle the large volume of data plane traffic going through the service gateways, hardware accelerated policy-based routing (PBR) is used. According to PBR, a data packet is associated with a data flow based on one or more fields in the header section of the layer 3 protocol, and all packets in the same data flow are directed to the same next hop network address. In the case of a load balancer, the next hop network address uniquely identifiers one service gateway among the cluster. It is common to generate a unique data flow identifier based on a 5-tuple of fields in an layer 3 header, e.g., protocol, source network address, destination network address, source port, and destination port. PBR is often implemented using an Access Control List, which lists a flow identifier and the next hop network address for that flow. A flow that is not on the ACL is not processed further. With hardware-accelerated PBR, a router includes special logic circuits that determine the data flow of the data packet and compares the data flow to the ACL. If the data flow is in the ACL, then the data packet is forwarded to a particular service gateway of the cluster associated with that data flow in the ACL. In general, to conserve resources on intermediate network devices, a PBR ACL does not uniquely identify individual flows, but rather specifies a portion of subscriber IP address space that is routed to a service gateway.

For subscriber-aware services, the load balancer should send all traffic from the same subscriber, and the associated control plane traffic generated on this subscriber's behalf (such as AAA or RADIUS traffic from the NAS), to the same service gateway in the cluster for the duration of the subscriber's network session.

In some approaches, a dynamic association is made between a particular control plane message from the end node or NAS and a particular service gateway node. An example dynamic association is a round robin association in which successive control plane messages are forwarded to successive different nodes in the cluster. In some of these approaches, a sticky table is formed at the load balancer to store an entry that associates a particular subscriber with a particular service gateway so that subsequent messages from the same subscriber go to the same service gateway node for the duration of the session. When the session is ended, the entry is deleted from the sticky table. The sticky table is formed by monitoring the AAA traffic. Content-aware load-balancing is available from Cisco System, Incorporated of San Jose, Calif. as described in "Cisco IOS Software Release 12.1(11b)E for Supervisor Engines of the Cisco Catalyst 6500 Series Switch and Cisco 7600 Series Internet," Product Bulletin 1687, 2002, the entire contents of which are hereby incorporated by reference as if fully set forth herein. At the time of this writing, Product Bulletin 1687 is available at the Internet domain www.cisco.com in a file named prod_bulletin09186a00800923b0.htm in the directory /en/US/products/hw/routers/ps368.

The association of all data flows with a particular subscriber is possible using the sticky tables. An advantage of treating all data flows from the same subscriber is to protect against denial of service (DOS) attacks in which one or a few subscribers generate a large number of data flows—for example as a synchronization (SYN) message flood. Such protection is afforded by U.S. patent application Ser. No. 11/273,112 filed Nov. 14, 2005 and entitled "Techniques for Network Protection Based on Subscriber-Aware Application Proxies," the entire contents of which are herby incorporated by reference as if fully set forth herein.

While suitable for many purposes, there are some deficiencies with the prior approaches. One deficiency is the requirement for the sticky table itself and the consumption of memory and processor resources to store and maintain the sticky table. Another deficiency arises in high availability deployments in which further resources are consumed in synchronizing the sticky table contents on the primary and one or more redundant load balancers. Another deficiency is that, to apply the information in the sticky table, each data packet in the data plane has to be checked against the sticky table instead of using PBR routing based on an ACL. This places a heavy load on the processing capability of the router, especially so because the data plane has orders of magnitude more traffic than the control plane. Furthermore, since hardware acceleration is not widely available for applying information from the sticky table, the hardware accelerated PBR engine is not available to accelerate the processing of the data plane traffic.

Based on the foregoing description, there is a clear need for service gateway load balancers that do not suffer all the deficiencies of prior art approaches. In particular there is a need for a service gateway load balancer that more quickly directs control plane and data plane traffic to the same service gateway and that does not require the use of a sticky table to ensure consistency between control plane load balancing (such as for RADIUS traffic) and data plane load balancing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for distributing control plane traffic to a service gateway. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are illustrated with many examples in the context of a NAS and a WAP gateway, but the invention is not limited to this context. In other embodiments other service gateways are used to provide services to users on any end nodes, such as compression and optimization service gateways on hard-wired networks and dial-in networks.

1.0 Network Overview

Figure 1A:
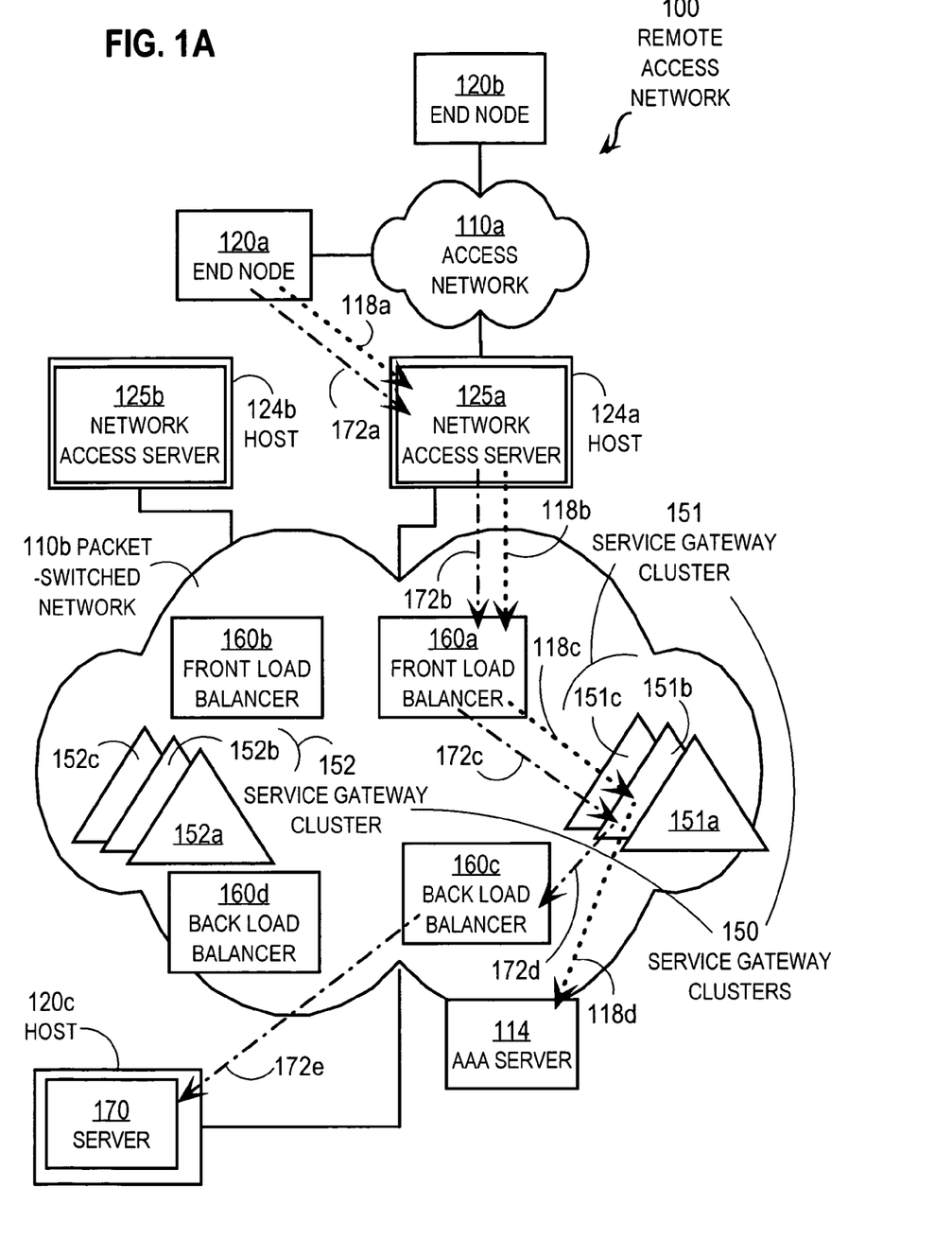
FIG. 1A is a block diagram that illustrates a remote access network that includes load balancers and service gateway clusters, according to an embodiment.

FIG. 1A is a block diagram that illustrates a remote access network 100 that includes load balancers 160 and service gateway clusters 150, according to an embodiment. A computer network is a geographically distributed collection of interconnected sub-networks (e.g., sub-networks 110a, 110b, collectively referenced hereinafter as sub-networks 110) for transporting data between nodes, such as computers and hand held devices. Each sub-network itself may be composed of one or more sub-networks. A local area network (LAN) is an example of a sub-network. The network's topology is defined by an arrangement of end nodes (e.g., end nodes 120a, 120b, 120c, collectively referenced hereinafter as end nodes 120) that communicate with one another, typically through one or more intermediate network nodes, such as a router or switch, that facilitates routing data between end nodes 120 on different sub-networks. Two sub-networks 110 that are typically involved in remote access are depicted in FIG. 1A. Each sub-network 110 may includes zero or more intermediate network nodes and subnetworks. An Internet Protocol (IP) packet-switched network (PSN) 110b is the target for remote access by users of end nodes 120a, 120b at one or more remote sites. The remote sites are connected to the PSN 110b through an access network 110a.

In various embodiments, access sub-network 110a is built, at least in part, on a telephone twisted pair, coaxial copper, optical cable or a wireless infrastructure. In various embodiments, access network 110a includes a controller for a bank of low-bandwidth modems, a digital subscription line (DSL) access module (DSLAM), or other coaxial cable or optical access modules. Although two end nodes 120a, 120b are depicted connected to access network 110a, in other embodiments more or fewer end nodes are connected to access network 110a. For mobile devices, the access network 110a includes circuitry and logic to maintain communication as the mobile device moves from one wireless access point (e.g., a mobile telephone cell antenna) to another.

Communications over sub-network 110a from end nodes 120a, 120b terminate at network access server (NAS) 125a executing on one or more hosts 124a. Other end nodes using other access networks terminate at other NAS, such as NAS 125b on host 124b. Although two NASs 125a, 125b (collectively referenced herein as NAS 125) are depicted connected to PSN 110b, in other embodiments more or fewer NASs are connected to PSN 110b. In various embodiments the NAS is a Broadband Remote Access Server (BRAS), a wireless access server, or some other server.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer or device on which the process operates. Similarly, the term "client" is conventionally used to refer to the process that makes the request, or the host computer on which the process operates. As used herein, the terms "client" and "server" refer to the processes, rather than the host computers or devices, unless otherwise clear from the context. In addition, the process performed by a server can be broken up to run as multiple servers on multiple hosts (sometimes called tiers) for reasons that include reliability, scalability, and redundancy.

PSN 110b is used by end nodes 120a, 120b at a remote site to communicate with another end node, such as host 120c on which executes server 170. PSN 110b includes AAA server 114, to authenticate the user of end nodes 120 attempting to access PSN 110b through any NAS 125.

To provide special subscriber-aware services, PSN 110b includes service gateway (SG) clusters 150 and SG load balancers (LB) 160a, 160b, 160c, 160d (collectively referenced herein as LB 160). SG clusters 150 include two clusters, SG cluster 151 and SG cluster 152. Each service gateway cluster includes two or more service gateways. In the illustrated embodiment each service gateway cluster includes three service gateways. SG cluster 151 includes SG 151a, SG 151b, SG 151c; and SG cluster 152 includes SG 152a, SG 152b, SG 152c. Although two clusters of three service gateways are shown in FIG. 1A for purposes of illustration, in other embodiments PSN 110b includes more or fewer service gateway clusters each with the same or different number of service gateways.

A load balancer (LB) distributes traffic among the service gateways in each cluster. In the illustrated embodiment each SG cluster 150 is associated with two load balancers, a front load balancer, e.g., LB 160a, LB 160b, respectively, for traffic from a NAS 125 toward other destinations in the PSN 110b, and a back load balancer, LB 160c, LB 160d, respectively, for traffic from other sources in the PSN 110b toward a NAS 125. Although two front and two back LBs 160 are shown in FIG. 1 for purposes of illustration, in other embodiments PSN 110b includes more or fewer load balancers.

For purposes of illustration, a path of a control plane message from end node 120a to AAA server 114 is indicated by dotted arrows 118a, 118b, 118c, 118d, collectively referenced hereinafter as control message path 118. Similarly, a path of a data plane message from end node 120a to server 170 is indicated by dot-dashed arrows 172a, 172b, 172c, 172d, 172e collectively referenced hereinafter as data message path 172.

To provide subscriber-aware services at load balanced SG clusters 150, a load balancer 160 and service gateway is inserted in the control message path 118 from NAS 125 to AAA server 114, to determine what subscriber is associated with a particular address on network 110b. That is, the LB 160 advertises itself as resolving traffic directed to AAA server 114, then directs that traffic to one service gateway, e.g., SG 151*b*, in a SG cluster 150. That service gateway, e.g., SG 151*b*, snoops through the AAA messages exchanged between the NAS 125 and the AAA server 114, to determine if an IP address is associated with a subscriber for the service provided by the service gateway.

Figure 1B:
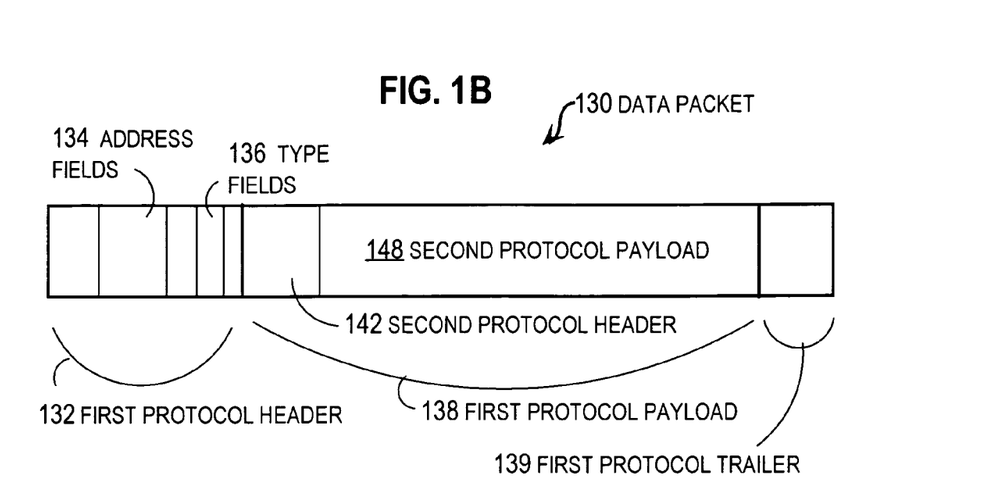
FIG. 1B is a block diagram that illustrates a generalized data packet communicated over a network.

FIG. 1B is a block diagram that illustrates a generalized data packet 130 communicated over a network, such as network 100, for both control plane and data plane traffic. Each packet typically comprises one or more payloads of data, e.g. payloads 138, 148, each encapsulated by at least one network header, e.g., headers 132, 142, respectively. For example, payloads are encapsulated by appending a header before the payload, sometimes called prepending a header, and sometimes by appending a trailer such as trailer 139 after the payload. Each header 132, 142 is formatted in accordance with a network communication protocol; header 132 is formatted according to a first protocol and header 142 is formatted according to a second protocol. The header 142 for the second protocol is included within the payload 138 of the first protocol. As used herein a header for a particular protocol and its payload constitute a data packet for that protocol and may also be called a cell, frame, datagram or message for that protocol. In some publications, data packets for different protocols are distinguished in shorthand by using a different one of the above terms for different protocols, e.g., to refer to Ethernet frames and IP datagrams, but here the terms are used interchangeably.

The header for a protocol typically includes type fields that identify the protocol to which the header belongs and sometimes the next protocol in the payload, if any. For example, the header 132 for the first protocol includes type fields 136. The header for a protocol often includes a destination address or a source address, or both, for the information in the payload. For example, the header 132 for the first protocol includes address fields 134 where the source and destination addresses for the first protocol are located within the packet 130. As described above, a transmitted data packet's network headers include at least a physical-link (layer 1) header, a data-link (layer 2) header, and possibly an internetwork (layer 3) header and possibly a transport (layer 4) header.

The physical-link (layer 1) header defines the electrical, mechanical and procedural mechanisms for proper capture of a frame on a communication medium. A network interface contains the mechanical, electrical and signaling circuitry and logic used to couple a network node to one or more physical links. The layer 1 header may include a DSL or ATM or Ethernet layer 1 header, or some combination.

The data-link header provides information for transmitting a data packet over a particular physical link, such as information for transmitting a point-to-point link, Ethernet layer 2 link, wireless link, optical link, etc. An intermediate network node typically contains multiple physical links with multiple different nodes. To that end, the data-link header may specify a pair of "source" and "destination" network interfaces that are connected by a physical link. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

The transport header provides information for ensuring that the packet is reliably transmitted from the source node to the destination node. The transport header typically includes, among other things, source and destination port numbers that respectively identify particular software applications executing in the source and destination end nodes. More specifically, the packet is generated in the source node by a software application assigned to the source port number. Then, the packet is forwarded to the destination node and directed to the software application assigned to the destination port number. The transport header also may include error-checking information (e.g., a checksum) and other data-flow control information. For instance, in connection-oriented transport protocols such as the Transmission Control Protocol (TCP), the transport header may store sequencing information that indicates the packet's relative position in a transmitted stream of packets.

2.0 Virtual Server Load Balancer

Figure 2:
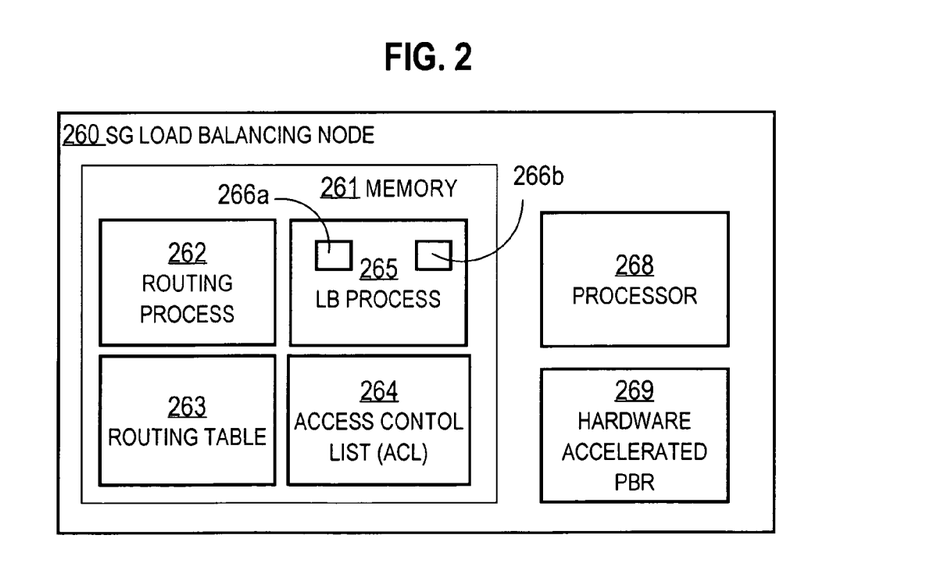
FIG. 2 is a block diagram that illustrates a service gateway load balancer, according to an embodiment.

FIG. 2 is a block diagram that illustrates a service gateway load balancing node 260, according to an embodiment. SG LB 260 is an embodiment of one or more nodes hosting the SG LBs 160 depicted in FIG. 1A. SG LB 260 includes a computer-readable medium serving as memory 261 and two logic circuits, processor 268, and hardware accelerated policy-based routing (PBR) processor 269. Processor 268 is a general purpose processor that includes logic circuits that execute instructions transferred to the processor 268 from memory 261. Hardware accelerated PBR processor 269 (hereinafter called PBR processor 269) is an application-specific integrated circuit (ASIC) configured to perform PBR based on an access control list (ACL).

Memory 261 includes instructions for a load balancing process 265, and a routing process 262, as well as data that represent a routing table 263 and the ACL 264 used by processor 269. The routing table 263 indicates the next hop for certain destinations, e.g., the next hop to reach the IP address of AAA server 114 or the IP address of 170. The routing process 262, when executed by processor 268 maintains data in the ACL and moves that data in a timely fashion into registers on the PBR processor 269. The routing process 262 subsequently passes data plane messages to the PBR processor 269 for determining the next hop network address and forwarding the message to that network address. Only messages associated with data flows that appears in the ACL are forwarded. Messages for data flows that are not in the ACL are ignored. When a new data flow is identified by the routing process 262 it is added into the ACL along with a next hop.

For a server that is hosted or proxied in the SG cluster of the load balancer, the next hop is selected among the SG cluster according to a particular policy. For example, a certain range of source IP addresses is sent to one SG server in the cluster and a different range is sent to a different SG server in the cluster. In other embodiments, other policies are used to associate a flow with one of several servers in the cluster. For example, in the back load balancers a certain range of destination IP addresses is sent to one SG server in the cluster and a different range is sent to a different SG server in the cluster.

According to the illustrated embodiments of the invention, the LB process 265 is modified, as described in more detail in the next section, to include control plane proxy 266a and a data plane emulator 266b that uses the data plane ACL 264 to determine a next hop network address of control plane messages, such as a RADIUS request message or other AAA request message. In these embodiments, the gateway server selected to process the control plane is the same as the gateway server that is automatically selected by the PBR processor 264 to receive the data plane traffic from the same subscriber. Thus the service gateway can properly associate a service procured by a subscriber with a data flow based on snooping the AAA traffic that associates the subscriber with the source IP address.

Furthermore, in the illustrated embodiment, the data plane ACL 264 is configured to segregate data plane traffic by subscriber IP address alone instead of by data flow (a combination of source IP and other data packet header fields). This approach not only protects the service gateway node targeted by the load balancer from being overwhelmed in a DoS attack (such as with a SYN flood) but also helps protect the control plane proxies segregated the same way, from such attacks.

In some embodiments, the LB process 265 and zero or more other processes on SG LB 260 are replicated on one or more other nodes (not shown) that are positioned to serve as a load balancer for a particular SG cluster 150. The replication is performed as protection against a single point of failure using any method known in the art, such as Hot Standby Routing Protocol (HSRP) and Virtual Router Redundancy Protocol (VRRP).

3.0 Method to Select Control Plane Virtual Server

Figure 3:
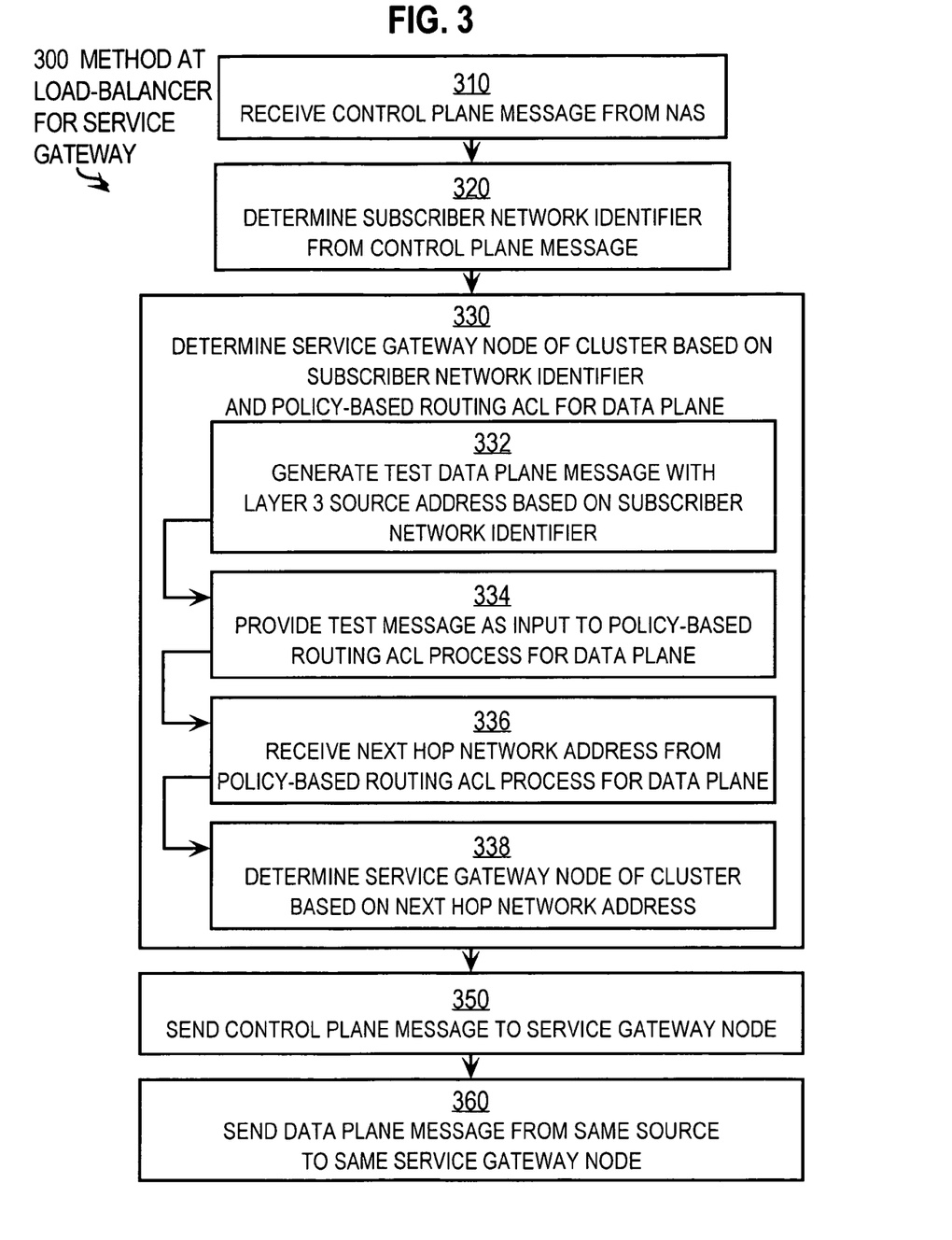
FIG. 3 is a flow diagram that illustrates a method at a high level for load balancing traffic for a service gateway, according to an embodiment.

FIG. 3 is a flow diagram that illustrates a method 300 at a high level for load balancing traffic for a service gateway, according to an embodiment. Although steps are shown in FIG. 3 in a particular order for purposes of illustration, in other embodiments the steps may be performed in a different order, or overlapping in time, or one or more steps may be omitted or added, or the flow may be changed in a combination of ways. In an illustrated embodiment, steps of method 300 are performed by control plane proxy 266a and data plane emulator 266b For purposes of illustration, it is assumed that an AAA control plane proxy 266a within LB process 265 on LB 260 receives an AAA authorization request (e.g., a RADIUS request) from NAS 125a. Since NAS 125a serves wireless subscribers on access network 110a, the AAA control plane proxy selects a service gateway, e.g., 151b, from service gateway cluster 151, using a load balancing process that produces the result expected for the data plane, as described in more detail below with reference to step 330. The AAA control plane proxy 266a sends the AAA authorization request to the selected service gateway 151b. Service gateway 151b forwards the request to AAA server 114.

3.1 First Example Embodiments

In step 310, the load balancer receives a control plane message from the end node. In the illustrated embodiment, as a proxy for the AAA server, the load balancer (e.g., SG LB 160a) receives an AAA request during step 310 from an end node or an access node for an adjacent network, such as from an NAS. The load balancer then selects one of the service gateways in a SG cluster that is appropriate for traffic from that NAS according to steps 320 and 330.

For example, a RADIUS request is typically made after an IP address is assigned to the subscriber, e.g. to end node 120a. For example, a dynamic host configuration protocol (DHCP) message exchange occurs to assign an IP address to end node 120a. Then a particular subscriber (e.g., subscriber Smith) uses end node 120a to try to access network 110b by sending a message with a user identifier (user ID) to NAS 125a. That message has in a source address field of its IP header the IP address of node 120a. As a first example, it is further assumed that subscriber Smith, a subscriber for WAP service in good accounts, is using mobile end node 120a to sign on to PSN 110b through wireless access network 110a and NAS 125a. A tunnel is generated for Smith to send data packets from end node 120a to NAS 125a. In response to establishing the tunnel from end node 120a to NAS 125a, NAS 125a prompts Smith for a network user identifier (user ID) and password using the display on end node 120a.

The NAS 125a then sends an AAA authorization request with the ID and password to SG LB 160a. In the illustrated example, the NAS 125a generates and sends a RADIUS request with the user ID and IP address of the user in the payload and the IP address of the NAS host 124a in a source address field of its IP header. The IP address of end node 120a carried in the payload section of the RADIUS message is called a framed-IP address attribute of the RADIUS payload, because it is in the RADIUS frame of the data packet, not in the IP header. Table 1 summarizes the contents of relevant fields in the message from end node 120a to NAS 125a, and the RADIUS request from the NAS 125a to the RADIUS server (e.g., AAA server 114). It is assumed for purposes of illustration that the subscriber has user ID "subscriber Smith", password "********" node 120a has IP address "1.2.100.1," host 124a has IP address "1.1.48.5," and RADIUS server 114 has IP address "1.1.1.14."

TABLE 1

Contents of relevant fields in access messages for subscriber Smith

| Protocol | Source | Destination | Payload field A | Payload field B | Payload field C |
|---|---|---|---|---|---|
| IP | 1.2.100.1 | 1.1.48.5 | Subscriber Smith | ******** | --------------- |
| IP | 1.1.48.5 | 1.1.1.14 | Subscriber Smith | ******** | 1.2.100.1 |

The front load balancers 160a, 160b advertise themselves as next hops on the way to various servers including RADIUS server 114 at 1.1.1.14 and server 170. Thus a routing protocol executing on NAS 125a determines to send message with destination 1.1.1.14 to the nearest functioning load balancer, assumed for purposes of illustration to be SG LB 160a. Thus the second message in Table 1 arrives at SG LB 160a during step 310. In more typical embodiments, static routes are configured on the devices adjacent to the load balancers 160, such as on the NAS 125, or its host 124.

In step 320, a subscriber network identifier is determined based on the control plane message. In an illustrated embodiment, the framed-IP address of end node 120a included in the payload of the RADIUS request is extracted during step 320 to be used as the subscriber network identifier in the illustrated embodiment. For example, in the illustrated embodiment, the SG LB 160a determines the subscriber network identifier is the framed-IP address "1.2.100.1" as shown in the last line of Table 1.

In step 330, a particular service gateway node of a cluster is determined based on the subscriber network identifier and the PBR ACL for the data plane. For purposes of illustration, it is assumed that the PBR ACL for the data plane indicates that data flow IDs based on source IP addresses in a range from 1.1.1.1 through 1.1.255.255 (expressed as start address 1.1.1.1 and mask 0.0.255.255) go to a first service gateway in the cluster (e.g., SG 151*a*); IP address in a range from 1.2.1.1 through 1.2.255.255 go to a second service gateway in the cluster (e.g., SG 151*b*), and IP address in a range from 1.3.1.1 through 1.255.255.255 go to a third service gateway in the cluster (e.g., SG 151*c*). In such a case, the IP address of subscriber Smith indicates that data plane traffic from this subscriber will be sent to the second service gateway in the cluster (e.g., SG 151*b*). Thus, in this example, during step 330 the service gateway node for the control plane message is determined based on the data plane traffic going to the second service gateway. In the illustrated embodiment, the service gateway for the control plane is determined to be the same as the service gateway of the data plane. In other embodiments, the service gateway for the control plane is determined to be otherwise related to the service gateway for the data plane. In some of embodiments, step 330 includes steps 332, 334, 336, 338, described in more detail in a later section.

In step 350, the control plane message is forwarded to the selected gateway server. In the illustrated embodiment, a RADIUS request is forwarded to the selected service gateway (e.g., SG 151*b*), which forwards the request to the RADIUS server (e.g. AAA server 114). The RADIUS server returns a response to the selected service gateway (e.g., SG 151*b*, either directly or through back load balancer 160*c*), each of which determines subscriber information based on the response and forwards the response to the appropriate upstream node (e.g., load balancer 160*a* from SG node 151*b*). The load balancer (e.g., 160*a*) also determines subscriber information based on the response, and forwards the response to the end node (e.g. NAS 125*a*). Thus the front load balancer 160*a* (and sometimes the back load balancer 160*d*) is in a control plane path between the AAA server and the end node, and both the load balancer and service gateway can determine subscriber information, including the subscriber network identifier (e.g., IP address) for the session, for subscriber-aware services.

For example, the AAA server 114 determines the subscriber Smith is an authorized subscriber in good account and that the password ******** authenticates the user of end node 120*a* as Smith, the authorized user. Based on this, the AAA server 114 returns an AAA accept message (e.g., a RADIUS accept message) with the subscriber Smith end node 120*a* IP address (1.2.100.1) to service gateway 151*b*. Service gateway 151*b* forwards the AAA accept message to the AAA control plane proxy 266*a* on LB 360. In prior approaches, the AAA control plane proxy in process 265 stores the subscriber IP address in association with the IP address for service gateway 151*b* in a sticky table. This step can be omitted using embodiments of the present invention, because the service gateway 151*b* was selected to match the gateway that will be selected automatically for the data plane. The AAA control plane proxy 266*a* forwards the AAA accept message (e.g., the RADIUS accept message) to the NAS 125*a*.

In embodiments that maintain a sticky table for other uses, the sticky table is not omitted; and, during further negotiations between subscriber Smith and AAA server 114 to start the current session, the control plane proxy 266*a* in process 265 stores any desirable additional information about subscriber Smith in the sticky table.

It is noted that load balancing a RADIUS request often involves translating the RADIUS virtual IP address to the selected service gateway IP address using a Network Address Translation (NAT) process. NAT processes are well known in the art. For RADIUS requests from the NAS, the load balancer uses a NAT process to translate the destination IP address from the load balancer's virtual IP address (VIP) to the service gateway's IP address. For RADIUS responses from the AAA server via the service gateway, the load balancer uses the NAT process to translate the source IP address from the service gateway back to the load balancer's VIP.

In step 360, data plane traffic from the same subscriber is sent to the gateway server with the desired relationship to the gateway server for the control plane. For example, in some embodiments, the data plane service gateway shares a data structure with a different control plane service gateway. The data structure associates a subscriber network ID, such as source IP address, with a particular service, such as WAP gateway service. In the illustrated embodiment, data plane traffic from the same subscriber is sent to the same gateway server as the control plane message was sent. This relationship allows the subscriber-awareness deduced through snooping by the gateway server on the control plane to be applied to associated data plane traffic.

For example, data plane path 172 includes a hop 172*c* from SG LB 160*a* to SG node 151*b*, where the subscribed service, if any can be performed or directed to a server that performs the service. After servicing, the data packet then continues on the data plane path 172 to its destination, e.g., to server 170. In the illustrated embodiment, the path 172 includes a hop 172*d* to back load balancer 160*c* and another hop 172*e* from back load balancer 160*c* to server 170 according to conventional layer 3 routing. Return data plane traffic goes through back load balancer 160*c*. The back load balancer uses learned routes from the forward direction to direct all destination IP addresses for the same subscriber (e.g., subscriber Smith) to the same service gateway (e.g., SG 151*b*) used in the forward direction.

Thus, in some embodiments for a NAS that serves a mobile network, during step 360 a particular WAP gateway (e.g., SG 151*b*) in a WAP gateway cluster (e.g., cluster 151) is automatically selected for a certain subscriber so that the selected gateway is the same as the host for the RADIUS proxy that authorized that subscriber to access the network. As a further example, in some embodiments for a NAS that serves a low-bandwidth dial in access network, a particular Web compression gateway for a certain subscriber is selected among a Web compression gateway cluster, which is on the same SG node that hosted the RADIUS proxy that authorized that subscriber. Similarly, in some embodiments for a NAS that serves a broadband access network, a particular Web optimization gateway for a certain subscriber is selected among a Web optimization gateway cluster, which is on the same SG node that hosted the RADIUS proxy that authorized that subscriber.

For example, a data plane input data packet is forwarded by NAS 125*a* from IP address 1.2.100.1 associated with subscriber Smith to LB process 265 on LB 360. The input data packet includes the subscriber Smith IP address as the networking-layer source address, a URL or IP address for a particular Web page host, e.g., host 120*c*, as the destination, and a transport destination port, e.g., 9200, that indicates a WAP application-layer protocol. Based on the ACL 264 and the IP address 1.2.100.1, this data plane data packet is forwarded automatically to gateway 151*b*.

In some embodiments, the data plane routing is performed using the ACL 264 transferred to the hardware PBR processor 269; and is automatically forwarded to the selected gateway (e.g., SG 151*b*) more rapidly than using general processor 268 by using a PBR ASIC. In some of these embodiments, step 330 includes steps 332, 334, 336, 338, as described next.

3.2 Second Example Embodiments

In second example embodiments, step 330, to determine a control plane service gateway that is the same as will be used by the data plane, includes steps 332, 334, 336, 338. In step 332 a test data plane message is constructed with a layer 3 source address based on the subscriber network ID. In an illustrated embodiment, it is assumed that the PBR is based on source IP only to better protect against DoS attacks from a certain subscriber. During step 332 the source IP for the test message is determined from the framed-IP address in the RADIUS request payload. It is assumed for illustration, that the PBR policy depends only on the Protocol and source address and is independent of the other elements of a 5-tuple that defines a data flow. It is further assumed that a test data plane message is constructed with the values of a 5-tuple data flow identifier as given in Table 2, using the framed-IP address in the control plane message received (last line of Table 1) and IP for the protocol and arbitrary values for the other elements. In the illustrated example the arbitrary destination is 255.255.255.255 (the Broadcast IP address) and both the source and destination ports are arbitrarily selected for UDP (port 9

TABLE 2

Example contents of 5-tuple that defines a data flow identifier

| Protocol | Source address | Destination address | Source port | Destination port |
|---|---|---|---|---|
| IP | 1.2.100.1 | 255.255.255.255 | 9 | 9 |

In the illustrated embodiment, the desired result is conditional on the RADIUS request including the framed-IP address that matches the subscriber IP address. This is not a difficult condition to satisfy because it is automatically true for Accounting request packets. For RADIUS access request packets, the framed-IP address is often not included, or, if included, the value stored therein is written over by the AAA server. In some embodiments RADIUS access message are routed from the NAS 125 to the AAA server 114 around the service gateway cluster 150. In some embodiments, the load balancer 160 sends all access requests to one service gateway, and thus does not load balance RADIUS access requests.

In step 334, the test message is provided as input to a policy-based routing ACL process for the data plane. In some embodiments, the hardware accelerated PBR processor 269 is used. For purposes of illustration, it is assumed that the hardware accelerated PBR processor is not used because it not only routes the test data plane message but also transmits it on the appropriate next hop interface. In such embodiments, the LB process 265 includes a data plane emulator 266b with instructions that use the ACL 264 to emulate in software the process performed in the hardware accelerated PBR processor 269.

In step 336, the next hop network address for the data plane is received. For example, in response to inputting the test data plane message to the data plane proxy emulator 266b that emulates the PBR processor 269, a value is returned that indicates the next hop for a particular service gateway in the cluster. For example, the next hop is the IP address of SG 151b or a media Access Control (MAC) address for the interface of the LB node that is connected to the host of SG 151b. For purposes of illustration, it is assumed that the value received in step 336 is the IP address of SG 151b, which is further assumed to be 1.1.15.2.

In step 338, a particular service gateway node of the cluster is determined based on the next hop address. For example, the particular service gateway node of the cluster is determined to be SG 151b based on the next hop address 1.1.15.2. This service gateway is used to receive the control plane message, as described above with reference to step 350, as well as data plane messages, as described above with reference to step 360.

4.0 Implementation Mechanisms—Hardware Overview

Figure 4:
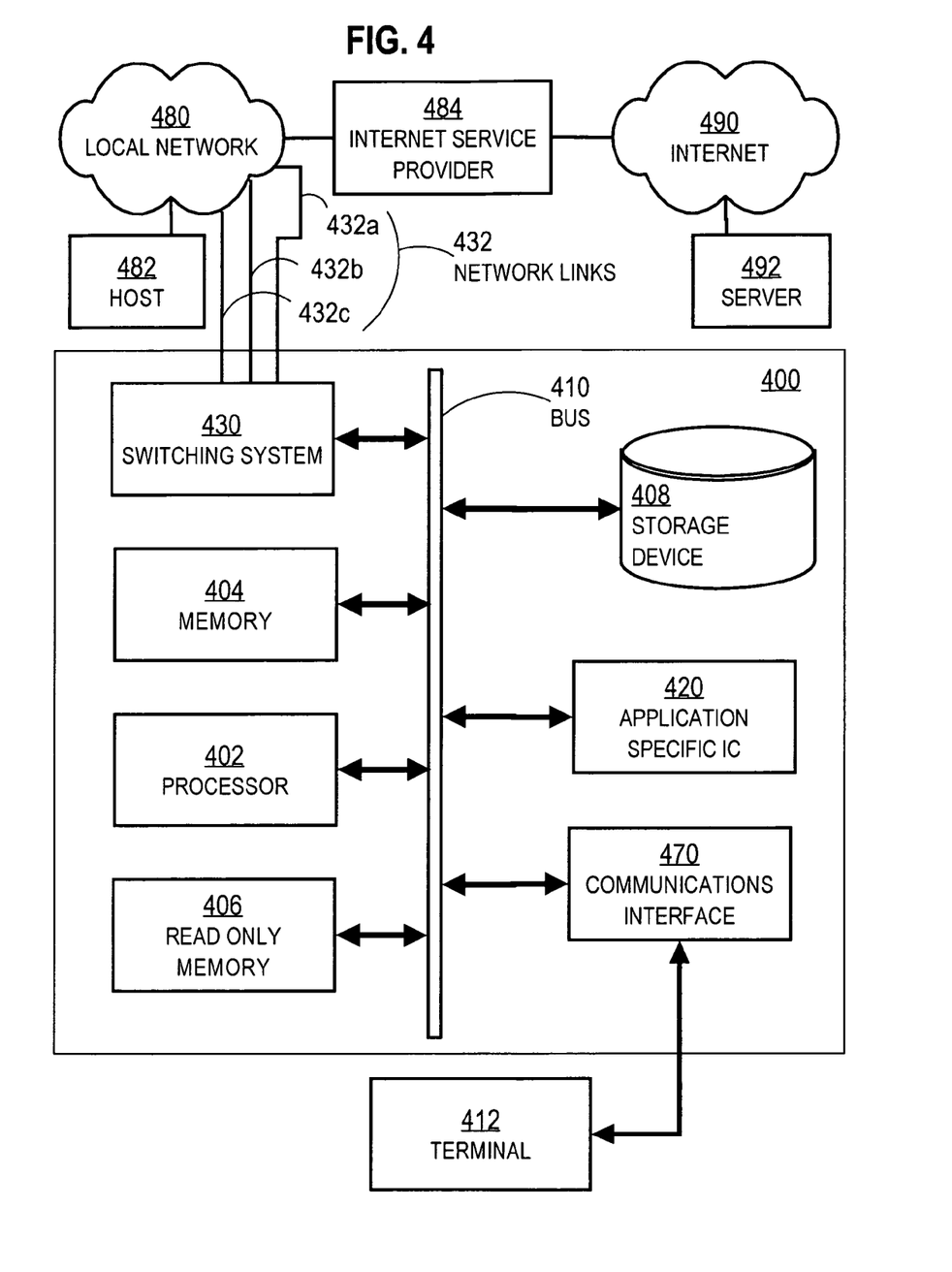
FIG. 4 is a block diagram that illustrates a computer system, such as a router, upon which an embodiment of the invention may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism, such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention.

Thus, embodiments of the invention are not limited to any specific combination of hardware and software.

The signals transmitted over network link 432 and other networks through communications interfaces such as interface 470, which carry information to and from computer system 400, are exemplary forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for distributing traffic from an end node in a packet switched network to a cluster of service gateway nodes that host subscriber-aware application servers, comprising the steps of:

receiving a control plane message for supporting data plane traffic from a particular subscriber;

determining a particular service gateway node among the cluster of service gateway nodes based on policy-based routing (PBR) for the data plane traffic from the particular subscriber, wherein the PBR includes a unique network identifier for the particular subscriber, the unique network identifier being used to determine a next hop network address for a message associated with the particular subscriber; and wherein determining the particular service gateway node further comprising:

determining the unique network identifier for the particular subscriber, providing the unique network identifier to a policy-based routing engine that determines a next hop network address for a message based on the unique network identifier; and receiving the next hop network address from the policy-based routing engine; and determining the particular service gateway node based on the next hop network address;

sending a message based on the control plane message to a control plane process on the particular service gateway node, whereby data plane traffic and control plane traffic from the same subscriber are directed to one or more related gateway nodes of the cluster of service gateway nodes.

2. A method as recited in claim 1, wherein the one or more related gateway nodes are the same gateway node.

3. A method as recited in claim 1, said step of providing the unique network identifier to a policy-based routing engine further comprising providing the unique network identifier to a policy-based routing engine that compares the unique network identifier to an access control list (ACL).

4. A method as recited in claim 1, said step of providing the unique network identifier to the policy-based routing engine further comprising providing the unique network identifier to a policy-based routing engine that implements in software executing on general-purpose logic circuits identical policy-based routing as implemented in function-specific logic circuits for data plane traffic, whereby execution of the policy-based routing engine for data plane traffic is accelerated over an implementation using general-purpose logic circuits.

5. A method as recited in claim 1, said step of determining a unique network identifier for the particular subscriber further comprising determining an internet protocol (IP) address for the subscribed from within a payload of the control plane message.

6. A method as recited in claim 1, said step of receiving the control plane message further comprising receiving an Authentication, Authorization, Accounting (AAA) request.

7. A method as recited in claim 6, said step of receiving the AAA request further comprising receiving a Remote Authentication Dial-In User Service (RADIUS) request.

8. A method as recited in claim 1, wherein a sticky table for recording information per subscriber based on a control plane response message directed to the network access server is not formed in memory on a device performing the method.

9. An apparatus for distributing traffic from an end node in a packet switched network to a cluster of service gateway nodes that host subscriber-aware application servers, comprising:

a first network interface that is coupled to a network for communicating therewith a first data packet;

a different second network interface that is coupled to a network for communicating therewith a second data packet;

one or more processors;

a storage device; and one or more sequences of instructions stored in the storage device, which, when executed by the one or more processors, causes the one or more processors to carry out the steps of:

receiving over the first interface a control plane message for supporting data plane traffic from a particular subscriber;

determining a particular service gateway node among the cluster of service gateway nodes based on policy-based routing (PBR) for the data plane traffic from the particular subscriber, wherein the PBR includes a unique network identifier for the particular subscriber, the unique network identifier being used to determine a next hop network address for a message associated with the particular subscriber; and wherein determining the particular service gateway node further comprising:

determining the unique network identifier for the particular subscriber, providing the unique network identifier to a policy-based routing engine that determines a next hop network address for a message based on the unique network identifier; and receiving the next hop network address from the policy-based routing engine; and determining the particular service gateway node based on the next hop network address;

sending over the second network interface a message based on the control plane message to a control plane process on the particular service gateway node, whereby data plane traffic and control plane traffic from the same subscriber are directed to one or more related gateway nodes of the cluster of service gateway nodes.

10. An apparatus as recited in claim 9, wherein the one or more related gateway nodes are the same gateway node.

11. An apparatus as recited in claim 9, said step of providing the unique network identifier to a policy-based routing engine further comprising providing the unique network identifier to a policy-based routing engine that compares the unique network identifier to an access control list (ACL).

12. An apparatus as recited in claim 11, wherein:

the apparatus further comprises function-specific logic circuits for PBR of data plane traffic based on the ACL, whereby execution of PBR of data plane traffic is accelerated over an implementation using general-purpose logic circuits; and said step of providing the unique network identifier to the policy-based routing engine further comprising providing the unique network identifier to a policy-based routing engine that implements identical policy-based routing as implemented in the function-specific logic circuits for PBR of data plane traffic.

13. An apparatus as recited in claim 9, said step of determining a unique network identifier for the particular subscriber further comprising determining an internet protocol (IP) address for the subscribed from within a payload of the control plane message.

14. An apparatus as recited in claim 9, said step of receiving the control plane message further comprising receiving an Authentication, Authorization, Accounting (AAA) request.

15. An apparatus as recited in claim 14, said step of receiving the AAA request further comprising receiving a Remote Authentication Dial-In User service (RADIUS) request.

16. An apparatus as recited in claim 9, wherein a sticky table for recording information per subscriber based on a control plane response message directed to the network access server is not formed in the computer-readable medium.

17. A storage device storing one or more sequences of instructions for distributing traffic from an end node in a packet switched network to a cluster of service gateway nodes that host subscriber-aware application servers, wherein execution of the one or more sequences of instructions by one or more processors causes the one or more processors to perform the steps of:

receiving a control plane message for supporting data plane traffic from a particular subscriber;

determining a particular service gateway node among the cluster of service gateway nodes based on policy-based routing (PBR) for the data plane traffic from the particular subscriber, wherein the PBR includes a unique network identifier for the particular subscriber, the unique network identifier being used to determine a next hop network address for a message associated with the particular subscriber; and wherein determining the particular service gateway node further comprising:

determining the unique network identifier for the particular subscriber, providing the unique network identifier to a policy-based routing engine that determines a next hop network address for a message based on the unique network identifier; and receiving the next hop network address from the policy-based routing engine; and determining the particular service gateway node based on the next hop network address;

sending a message based on the control plane message to a control plane process on the particular service gateway node, whereby data plane traffic and control plane traffic from the same subscriber are directed to one or more related gateway nodes of the cluster of service gateway nodes.

* * * * *